United States Patent
Wu et al.

(10) Patent No.: US 7,803,484 B2
(45) Date of Patent: Sep. 28, 2010

(54) HIGH RATE CAPABILITY DESIGN OF LITHIUM ION SECONDARY BATTERY

(75) Inventors: Hung-Chun Wu, Hsinchu (TW); Ching-Yi Su, Hsinchu (TW); Ping-Hsun Hsieh, Hsinchu (TW); Bing-Ming Lin, Hsinchu (TW); Mo-Hua Yang, Hsinchu (TW); Nae-Lih Wu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 884 days.

(21) Appl. No.: 11/384,366

(22) Filed: Mar. 21, 2006

(65) Prior Publication Data

US 2007/0154809 A1 Jul. 5, 2007

(30) Foreign Application Priority Data

Dec. 29, 2005 (TW) .............................. 94147275 A

(51) Int. Cl.
*H01M 4/58* (2010.01)
(52) U.S. Cl. .................... 429/218.1; 429/221; 429/217; 429/231.95
(58) Field of Classification Search .............. 429/218.1, 429/221, 217, 231.95
See application file for complete search history.

(56) References Cited

U.S. PATENT DOCUMENTS

| 2003/0003369 A1* | 1/2003 | Dai ............................ 429/324 |
| 2005/0132562 A1* | 6/2005 | Saito et al. ................. 29/623.5 |
| 2005/0233219 A1 | 10/2005 | Gozdz et al. |

FOREIGN PATENT DOCUMENTS

| EP | 1 193 783 A2 | 4/2002 |
| EP | 1 193 784 A2 | 4/2002 |
| EP | 1 193 785 A2 | 4/2002 |
| EP | 1 193 787 A2 | 4/2002 |
| EP | 1 195 835 A2 | 4/2002 |
| EP | 1 195 836 A2 | 4/2002 |
| EP | 1 195 837 A2 | 4/2002 |
| EP | 1 256 995 A1 | 11/2005 |
| EP | 1 603 177 A1 | 12/2005 |

* cited by examiner

*Primary Examiner*—Jane Rhee
(74) *Attorney, Agent, or Firm*—Bacon & Thomas, PLLC

(57) ABSTRACT

A lithium ion secondary battery includes $LiFePO_4$ as a major component of the positive electrode active material. In order to implement the high rate capability with 10C/1C rate larger than 80%, the invention designs a positive electrode on a current collector with a ratio (A/t) of coating area to coating thickness greater than $1.2 \times 10^6$ (mm) and uses more than one tab on the current collector. The design of the invention can be applied to other active materials with low conductivity as the positive electrode for lithium ion battery.

19 Claims, 4 Drawing Sheets

HIGH RATE CAPABILITY DESIGN OF LITHIUM ION SECONDARY BATTERY

FIELD OF THE INVENTION

The present invention is related to lithium ion secondary batteries with high rate capability, and more particularly, to a lithium ion secondary battery with high rate capability that uses $LiFePO_4$, a material with low conductivity, as the major component of the positive electrode active material.

BACKGROUND OF THE INVENTION

Lithium iron phosphate ($LiFePO_4$) has an olivine crystal structure, and is one of the positive electrode active materials for lithium ion secondary battery that has been intensively studied in recent years. One of the critical drawbacks of using $LiFePO_4$ as the positive electrode active material in the lithium ion secondary battery is that the conductivity of $LiFePO_4$ is extremely low ($10^{-9}$ S/cm), which is significantly lower than that of the other positive electrode active materials like $LiMn_2O_4$ or $LiCoO_2$ ($10^{-3}$~$10^{-4}$ S/cm). As a result, the lithium ions are impeded while entering or leaving the positive electrode, thereby affecting the high rate capability of the lithium ion secondary battery employing $LiFePO_4$ as the positive electrode active material; causing it to perform comparatively worse than $LiMn_2O_4$ or $LiCoO_2$. Approaches in the literature for solving the problems associated with low conductivity of $LiFePO_4$ can be divided into the following three categories:

1. Enhancing the conductivity of $LiFePO_4$ by coating a layer of carbon on the surface thereof [1. N. Ravet, J. B. Goodenough, S. Besner, M. Simouneau, P. Hovington and M. Armand, Proceedings of 196th ECS Meeting, Hawaii, 17-22 Oct. 1999; 2. N. Ravet, Y Chouinard, J. F. Magnan, S. Besner, M. Gauthier, and M. Armand, J. power sources, 97-98, 503 (2001); 3. P. P. Prosini, D. Zane, M. Pasquali, Electrochim. Acta, 46, 3517(2001); 4. H. Huang, S.-C. Ym, F. Nazar, Electrochem. Solid State Lett., 4, A170(2001); 5. Z. Chen, J. R. Dahn, J. Electrochem. Soc., 149, A1189(2002)];

2. Enhancing the conductivity of $LiFePO_4$ by doping other metals into $LiFePO_4$ [1. S. Y. Chung, J. T. Bloking, and Y M. Chiang, Nat. Mater., 1, 123(2002)];

3. Enhancing the high rate capability of $LiFePO_4$ by using nano $LiFePO_4$ [1. A. Yamada, S. C. Chung, and K. Hinokuma, J. Electrochem. Soc., 148, A224(2001); 2. P. P Prosini, M. Carewska, S. Scaccia, P. Wisniewski, S. Passerini, M. Pasquali, J. Electrochem. Soc., 149, 886(2002); 3. S. Franger, F. Le Cras, C. Bourbon, H. Rouault, Electrochem. Solid State Lett., 5, 231 (2002)].

Right now, the commonly used commercial $LiFePO_4$ has been subjected to the carbon coating treatment, and the particle size thereof ranges approximately between sub-micron and micron. Although the conductivity of $LiFePO_4$ can be raised to between $10^{-2}$ and $10^{-3}$ S/cm after the carbon coating treatment, its high rate capability remains low for other reasons yet to be clarified. Research has continuously been conducted to explore electrode design method capable of solving the issue of high rate capability of $LiFePO_4$.

US Patent publication No. 2005/0233219A1 and 2005/0233220A1 disclosed lithium ion secondary batteries with high rate capability that use $LiFePO_4$ as the major ingredient in its positive electrode active materials. In the former, $LiFePO_4$ is doped with titanium, zirconium, niobium, aluminum, or magnesium, and in the latter, a layer of the positive electrode active material on a current collector has an area specific impedance (hereinafter abbreviated as ASI) that is less than 20 $\Omega$-$cm^2$. The contents of these two US patents are incorporated herein by references.

SUMMARY OF THE INVENTION

The present invention discloses a lithium ion secondary battery that uses $LiFePO_4$ as the main component as its positive electrode active material. In order to allow the lithium ion secondary battery to have high rate capability (the capacity at the discharge rate of 10C is greater than 80% of the capacity at the discharge rate of 1C), the lithium ion secondary battery constructed according to the present invention has features as follows: an electrode layer of the positive electrode active material on a current collector having a ratio of its area to its thickness (A/t) greater than $1.2 \times 10^6$ mm, so that the layer has a reduced ion impedance; if necessary, more than one tab being attached on the current collector of the positive electrode in order to lower the electronic impedance of the current collector, and thus the positive electrode will have a reduced total impedance. The design of the present invention can be applied to other positive electrode active materials having a low conductivity as well.

Through various designs of the lithium ion secondary battery, the present invention explores the impact of electronic impedance and ionic impedance of the coating material on the positive electrode substrate on the discharge capability of the battery, and seeks to overcome the disadvantage of below-average high rate capability resulting from the low conductivity of $LiFePO_4$, so that a lithium ion secondary battery with high rate capability can be produced, for instance, a lithium ion secondary battery having a 10C discharge capability greater than 80% can be produced, which can be applied to products with high power consumption. The 10C discharge capability is defined as the ratio of the capacity of the lithium ion secondary battery discharged at 10C rate to that discharged at 1C rate (hereinafter abbreviated as 10C discharge capability).

Preferred embodiments of the present invention include (but not limited thereto) the following items:

1. A lithium ion secondary battery comprising a positive electrode; a negative electrode; a separating film that separates the positive electrode and the negative electrode; and an electrolyte forming a lithium ion channel between the positive electrode and the negative electrode, wherein the positive electrode comprises a current collector substrate; one single tab or a plurality of tabs connected to the current collector substrate; and an electrode layer of a positive electrode material on one surface of the current collector, wherein the positive electrode material comprises a positive electrode active material, conductive carbon, and a binder that binds the positive electrode active material onto the substrate, characterized in that the positive electrode active material comprises $LiFePO_4$ as a major component thereof, and the electrode layer of the positive electrode material has a ratio of its area to its thickness greater than $1.2 \times 10^6$ mm.

2. The lithium ion secondary battery of Item 1, wherein a farthest distance between the single tab and the edge of the substrate is less than 1200 mm when the positive electrode only has one single tab; and two adjacent tabs has a span less than 2400 mm along a longitudinal direction of the substrate, when the positive electrode includes a plurality of tabs.

3. The lithium ion secondary battery of Item 1, wherein the lithium ion secondary battery has an alternating current impedance at 1 KHz of less than or equal to 30 m$\Omega$.

4. The lithium ion secondary battery of Item 2, wherein the electrode layer of the positive electrode material on one surface of the substrate has a thickness between 30 to 150 μm.

5. The lithium ion secondary battery of Item 2, wherein the lithium ion secondary battery has a ratio between its capacity at discharge rate of 10C and its capacity at discharge rate of 1C is greater than 80%.

6. The lithium ion secondary battery of Item 2, wherein the positive electrode active material further comprises $LiMn_2O_4$, $LiCoO_2$, $Li[Ni,Co,Mn]O_2$, or $Li[Ni,Co,Al]O_2$.

7. A lithium ion secondary battery comprising a positive electrode; a negative electrode; a separating film that separates the positive electrode and the negative electrode; and an electrolyte forming a lithium ion channel between the positive electrode and the negative electrode, wherein the positive electrode comprises a current collector substrate; one single tab or a plurality of tabs connected to the current collector substrate; and an electrode layer of a positive electrode material on one surface of the substrate, wherein the positive electrode material comprises a positive electrode active material, conductive carbon, and a binder that binds the positive electrode active material onto the substrate, characterized in that the positive electrode active material comprises a lithium compound as a major component thereof, the lithium compound has a conductivity of a level between $10^{-5}$ to $10^{-10}$ S/cm, and the electrode layer of the positive electrode material has a ratio of its area to its thickness greater than $1.2 \times 10^6$ mm.

8. The lithium ion secondary battery of Item 7, wherein the lithium compound is a lithium transition metal phosphate.

9. The lithium ion secondary battery of Item 8, wherein the lithium transition metal phosphate is $LiMPO_4$ with an olivine or modified olivine crystal structure, wherein M is a transition metal.

10. The lithium ion secondary battery of Item 9, wherein $LiMPO_4$ is $LiFePO_4$, metal-doped $LiFePO_4$, or surface-modified or carbon-coated $LiFePO_4$.

11. The lithium ion secondary battery of Item 7, wherein a farthest distance between the single tab and the edge of the substrate is less than 1200 mm when the positive electrode only has one single tab; and two adjacent tabs has a span less than 2400 mm along a longitudinal direction of the substrate, when the positive electrode includes a plurality of tabs.

12. The lithium ion secondary battery of Item 7, wherein the lithium ion secondary battery has an alternating current impedance at 1 KHz of less than or equal to 30 mΩ.

13. The lithium ion secondary battery of Item 11, wherein the electrode layer of the positive electrode material on one surface of the substrate has a thickness between 30 to 150 μm.

14. The lithium ion secondary battery of Item 11, wherein the lithium ion secondary battery has a ratio between its capacity at discharge rate of 10C and its capacity at discharge rate of 1C greater than 80%.

15. The lithium ion secondary battery of Item 11, wherein the positive electrode active material further comprises $LiMn_2O_4$, $LiCoO_2$, $Li[Ni,Co,Mn]O_2$, or $Li[Ni,Co,Al]O_2$.

DETAILED DESCRIPTION OF THE PREFERRED EMBODIMENTS

Figure 1A:
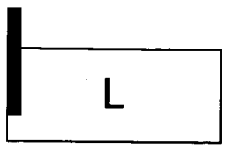
FIGS. 1A to 1J show ten different designs of positive electrode according to the present invention, which include different length of positive electrode and different positions of tab, wherein L is the length of the current collector.
Figure 1B:
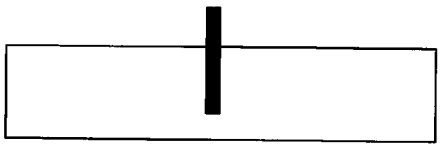
Figure 1C:
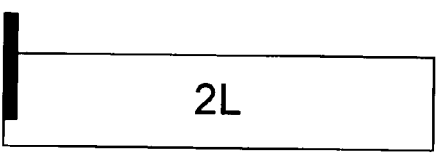
Figure 1D:
Figure 1E:
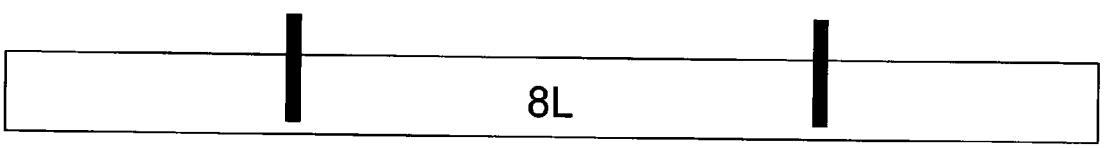
Figure 1F:
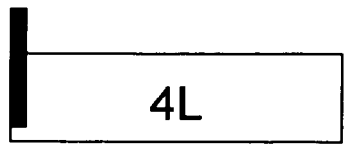
Figure 1G:
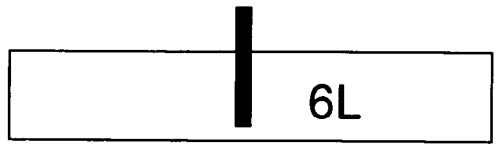
Figure 1H:
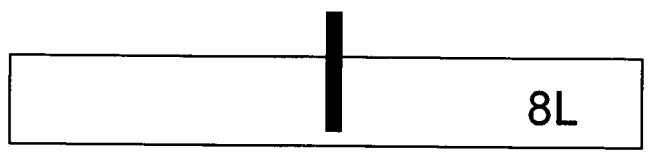
Figure 1I:
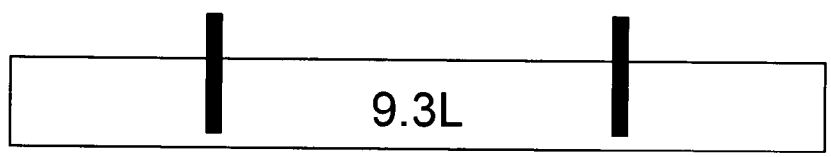
Figure 1J:
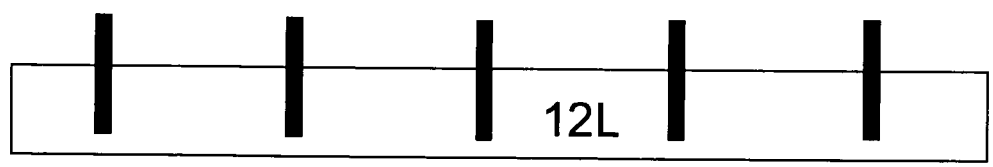

In the design of electrode of a battery, the sources of impedance include two parts: 1. electronic impedance, and 2. ionic impedance. To the positive electrode that uses $LiFePO_4$ as its major active material, which has low conductivity, its main source of impedance includes electronic impedance from the current collector and ionic impedance from the electrode layer on the current collector.

The electronic impedance $R_{electron}$ of the current collector can be represented by the following formula:

$$R_{electron} = 1/\sigma \cdot L/A$$

wherein σ is the electronic conductivity of the current collector, L is the length of its conductive pathway, and A is the cross-sectional area.

The ionic impedance $R_{ion}$ of the electrode layer of positive electrode material can be represented by the following formula:

$$R_{ion} = 1/\kappa \cdot t/A'$$

wherein κ is the ionic conductivity of the electrode layer of positive electrode material, t is the thickness of the layer, and A' is the area of the electrode layer. Further, $$\kappa = \kappa_0 \cdot \epsilon^n$$

wherein $\kappa_0$ equals to the intrinsic conductivity of layer without pores, ϵ equals to the porosity of electrode, and n equals to the tortuosity of the porosity of electrode.

To understand the performance of $LiFePO_4$ at 10C discharge rate under different designs of positive electrode, 10 groups of different length of positive electrode and different positions of tabs have been designed, as shown in FIGS. 1A to 1J. These designs have been put to test in the attempt to understand the influence of electronic/ionic impedance on the performance of 10C discharge rate, in which L represents the length of the current collector of positive electrode (1L=300 mm), and the tabs are represented by dark color. The surface of the current collector of positive electrode has been completely covered with an electrode layer of positive electrode material except for the areas of the tabs of different arrangements.

The designs of the 10 groups of experiments are listed in Table 1 and Table 2 below.

The details related to the preparation of the battery production and the measurement of ACIR at 1 KHz of the whole battery will be explained in the following examples.

TABLE 1

| | Group | | | | |
|---|---|---|---|---|---|
| | 1 (FIG. 1A) | 2 (FIG. 1B) | 3 (FIG. 1C) | 4 (FIG. 1D) | 5 (FIG. 1E) |
| Electrode length (mm) | 300 | 600 | 600 | 600 | 2400 |
| Electrode width (mm) | 38 | 38 | 38 | 38 | 38 |
| Electrode layer thickness on one side (t, μm) | 49 | 49 | 49 | 49 | 49 |
| Electrode layer area (A')/thickness (t) (mm) | 2.33E+5 | 4.65E+5 | 4.65E+5 | 4.65E+5 | 1.86E+6 |
| Number of tabs | 1 | 1 | 1 | 2 | 2 |
| Position of tabs | edge | center | edge | edge | center |
| Unit of length (mm)* | 300 | 300 | 600 | 300 | 600 |
| ACIR (m-ohm)** | 64.62 | 35.71 | 46.86 | 33.52 | 16.53 |
| 1 C capacity (discharge current) | 230.7 mAh (270 mA) | 454.7 mAh (500 mA) | 431.1 mAh (500 mA) | 438.1 mAh (500 mA) | 1855.1 mAh (1950 mA) |
| 10 C capacity | 115.7 mAh | 333.3 mAh | 314.0 mAh | 2999.9 mAh | 1764.9 mAh |
| 10 C discharge capability | 50.1% | 73.3% | 72.8% | 68.5% | 95.1% |

*The farthest distance from the tab to the edge of the current collector, or ½ of the distance between the two adjacent tabs.
**ACIR is the alternating current impedance at 1 KHz of the whole battery.

In Group 2, 3, and 4, the experiments have been carried out by using the same length of the current collector but with different conducting mechanisms. Because the area of the electrode layer and the thickness of the electrode layer on one surface of the current collector are identical, the ionic impedance of the coating layer can be seen as fixed. However, the electronic impedance creates different effects due to different positions and number of the tabs. The results show that the ACIR at 1 KHz of the whole battery are 35.71, 46.86, and 33.52 mΩ, and the 10C discharge capability are 73.3%, 72.8%, and 68.5% respectively, which indicate that the differences in the electronic impedance of current collector do not have significant effect on the 10C discharge capability.

In Group 1, 2, and 5, the experiments have been done by controlling the electronic impedance fixed, which means the unit length of electrode (the distance from the edge of the current collector to the tab) are identical. In Group 5, the unit length of electrode plate is increased because there are two tabs in parallel, so that the electronic impedance of the three groups are the same. However, their ionic impedance varies because the areas of the electrode layer (A') are different. The ACIR at 1 KHz of the whole battery are 64.62, 35.71, 16.53 mΩ, whereas the 10C discharge capability are 50.1%, 73.3%, and 95.1% respectively, which indicate that the ionic impedance causes dramatic difference in ACIR, and affects the 10C discharge capability significantly.

Further, Group 1 and 3 utilize identical number and position of tab, except that the unit length of electrode in Group 3 is two times of Group 1, thus the electronic impedance in Group 3 must be larger than that in Group 1. However, the ACIR at 1 KHz of the whole battery in Group 3 is 46.9 mΩ, which is lower than 64.6 mΩ of Group 1, and the 10C discharge capability of Group 3 is also better than that of Group 1, which are 72.8% and 50.1% respectively.

From the results described above, it is obvious to see that the ionic impedance originating from the $LiFePO_4$ is the main factor influencing the high rate capability of positive electrode.

TABLE 2

| | Group | | | | |
|---|---|---|---|---|---|
| | 6 (FIG. 1F) | 7 (FIG. 1G) | 8 (FIG. 1H) | 9 (FIG. 1I) | 10 (FIG. 1J) |
| Electrode length (mm) | 1200 | 1800 | 2400 | 2800 | 4200 |
| Electrode width (mm) | 38 | 38 | 38 | 38 | 77 |
| Electrode layer thickness on one side (t, μm) | 49 | 49 | 49 | 49 | 49 |
| Electrode layer area (A')/thickness (t) (mm) | 9.31E+5 | 1.40E+6 | 1.86E+6 | 2.17E+6 | 6.60E+6 |
| Number of tabs | 1 | 1 | 1 | 2 | 5 |
| Position of tabs | edge | center | center | center | center |
| Unit of length (mm)* | 1200 | 900 | 1200 | 700 | 420 |
| ACIR (m-ohm)** | 48.02 | 23.43 | 25.25 | 14.12 | 5.0 |
| 1 C capacity (discharge current) | 1142.6 (1100) | 1662.1 (1650) | 2240.3 (2200) | 2550.1 (2600) | 8157 (8200) |
| 10 C capacity | 977.5 | 1530.6 | 1933.1 | 2194.7 | 7749 |
| 10 C discharge capability | 85.6% | 92.1% | 86.3% | 86.1% | 95.0% |

*,**same as in Table 1

If the unit length of the positive electrode is too long, the discharge capability thereof might be dictated by electronic impedance instead of ionic impedance. To solve this problem, more than one taps are provided so that the dominated electronic impedance resulting from an increased electrode length (overlong electronic conductive pathway) can be resolved, as shown in the experimentation of Group 9.

Group 5 is chosen to be the sole representative of the experiments and elucidated in the following example, because the experimental conditions in each group listed in Table 1 and Table 2 are similar.

EXAMPLE

Group 5

The preparation of positive electrode:

After dissolving 8 g of polyvinylidene fluoride (PVDF) in 150 g of N-methyl-2-pyrrolidone (NMP), 7 g of conductive carbon (1 g of Super P and 6 g of KS6 from Timcal Corp.) and 85 g of LiFePO$_4$ (from Phostech Corp., which has an average particle size of 5 μm, and 1.2 wt % of carbon coated thereon) were added and well mixed to obtain a positive electrode paste. The paste was coated evenly on both sides of a substrate made of aluminum foil, the solvent was removed from the coating by drying, followed by calendering to obtain a positive electrode having a total thickness (including the 20 μm substrate and two coating layers on both sides thereof) of 118 μm and a capacity of 2.72 mAh/cm$^2$.

The Preparation of Negative Electrode:

After dissolving 10 g of PVDF in 88.7 g of NMP, 88 g of mesophase microbead synthetic graphitic carbon (Osaka Gas Co. Ltd., code: MCMB10-28) was added and well mixed well to obtain a negative electrode paste. The paste was coated evenly on both sides of a substrate made of copper foil, and the solvent was removed from the coating by drying, followed by calendering to obtain a negative electrode having a total thickness (including the 14 μm substrate and two coating layers on both sides thereof) of 90 pm and a capacity of 3.0 mAh/cm$^2$.

The Assembly of Battery:

The positive and negative electrodes of adequate length were taken and separated by a separator polyethylene (DSM Corp., code: 14P01E) having a thickness of 25 μm. The resulting laminate was rolled to form a cylinder and an appropriate amount of electrolyte of 1.1 M LiPF$_6$ EC/EMC was added to obtain a cylindrical battery, wherein EC stands for ethylene carbonate and EMC stands for ethyl methyl carbonate.

The Measurement of Impedance of a Whole Battery:

The impedance of AC impedance was measured at 1 KHz.

The Measurement of 1C Capacity:

The battery was fully charged (1C CCCV, 3.65V, I-Cut: 0.01C), and the capacity was measured by discharging the battery at 1C current to 2.3V.

The Measurement of 10C Capacity:

The battery was fully charged (1C CCCV, 3.65V, I-Cut: 0.01C), the capacity was measured by discharging the battery at 10C current to 2.3V.

In order to prove that the design of the present invention is different from the area specific impedance (ASI) design used in the US patent publication numbers 2005/0233219A1 and 2005/0233220A1, the values of A/t and ASI from each experiment in Table 1 and 2 are listed in Table 3 below. The relationship between ASI and A/t is also shown in FIG. 2 and Table 3.

TABLE 3

| Group | A/t | Area Specific Impedance (ASI, $\Omega$-cm$^2$) |
|---|---|---|
| 1 | 2.33E+5 | 7.37 |
| 2 | 4.65E+5 | 8.14 |
| 3 | 4.65E+5 | 10.68 |
| 4 | 4.65E+5 | 7.64 |
| 5 | 1.86E+6 | 15.07 |
| 6 | 9.31E+5 | 21.90 |
| 7 | 1.40E+6 | 16.02 |
| 8 | 1.86E+6 | 23.03 |
| 9 | 2.17E+6 | 15.02 |
| 10 | 6.60E+6 | 330.00 |

Figure 2:
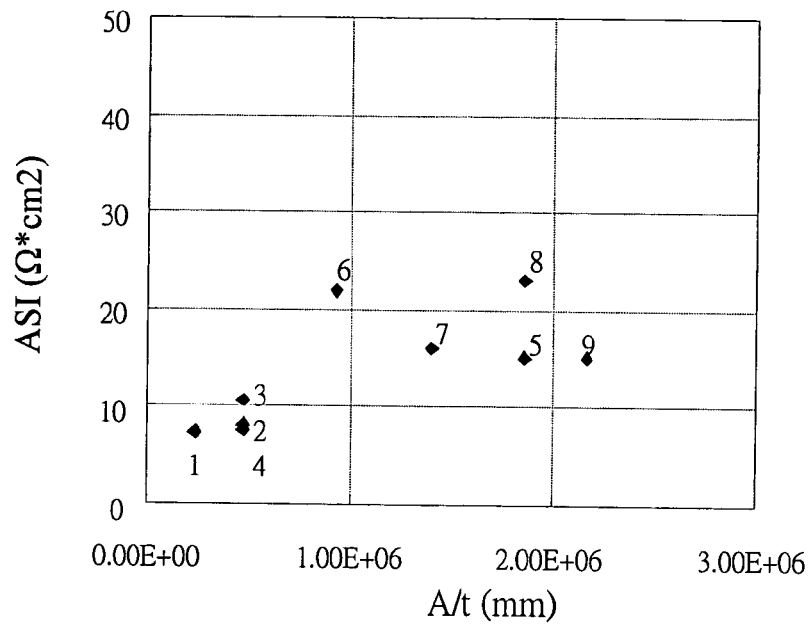
FIG. 2 indicates the relationship between the A/t ratio of the electrode layer and the ASI, as defined in US patent publication Nos. 2005/0233219A1 and 2005/0233220A1, of the lithium ion secondary batteries having the 10 different designs shown in FIGS. 1A to 1J.

It can be seen from FIG. 2 and Table 3 that the ASI values of some of the batteries are greater than 20 $\Omega$-cm$^2$ when the A/t values of the coating layer as required in the design of the present invention is greater than 1.2*10$^6$; and the ASI values of some of the batteries are less than 20 $\Omega$-cm$^2$ when the A/t values of the coating layer are smaller than 1.2*10$^6$. FIG. 2 shows that there is no unique correlation between the A/t value and ASI value. For instance, the electrode layers having the same A/t could have different ASI's. Further, the US patent publication Nos. 2005/0233219A1 and 2005/0233220A1 claim high-rate LiFePO$_4$ positive electrode design having ASI$\geq$20 $\Omega$-cm$^2$. However, the ASI value of the battery in Group 10 is greater than 20 $\Omega$-cm$^2$, but its 10C/1C capacity ratio (10C discharge capability) is only 2.5%. In contrast, the ASI value of the battery in Group 5 is less than 20, but its 10C discharge capability is as high as 95.1%. The results indicate that there is no correlation between the 10C discharge capacity and the ASI value of the battery prepared in the present invention.

Figure 3:
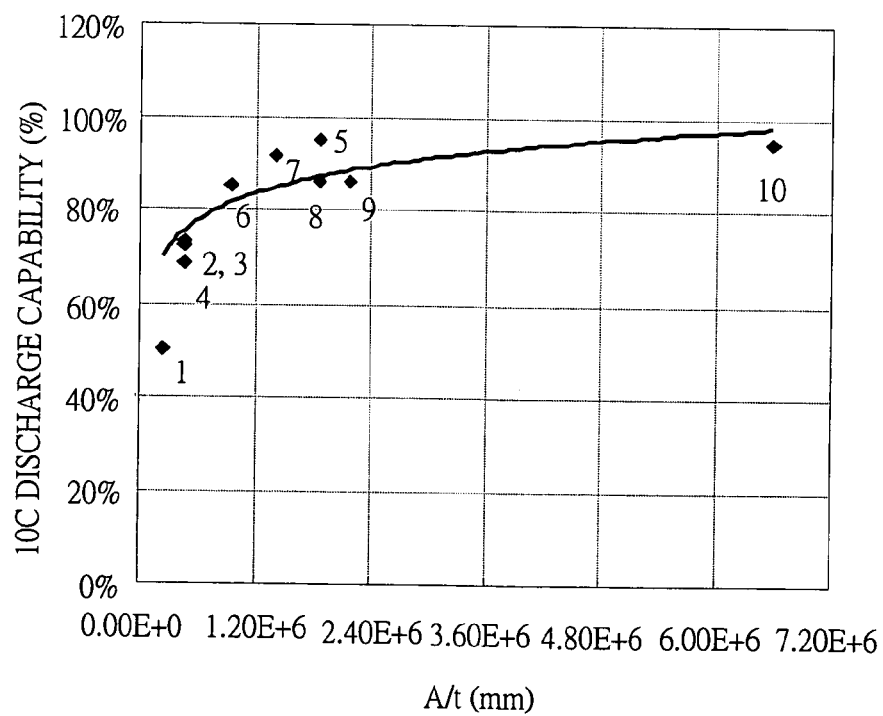
FIG. 3 shows the relationship between the A/t ratio of the electrode layer and the 10C discharge capability of the lithium ion secondary batteries having the 10 different designs shown in FIGS. 1A to 1J.

FIG. 3 illustrates the relationship between the 10C discharge capability and the A/t ratio of the coating layer of the lithium ion secondary batteries having designs of Group 1 to Group 10 listed in Table 1 and 2. FIG. 3 clearly shows that the 10C discharge capability of the battery will exceed 80%, when the value of A/t is designed to be greater than 1.2*10$^6$ according to the present invention.

Figure 4:
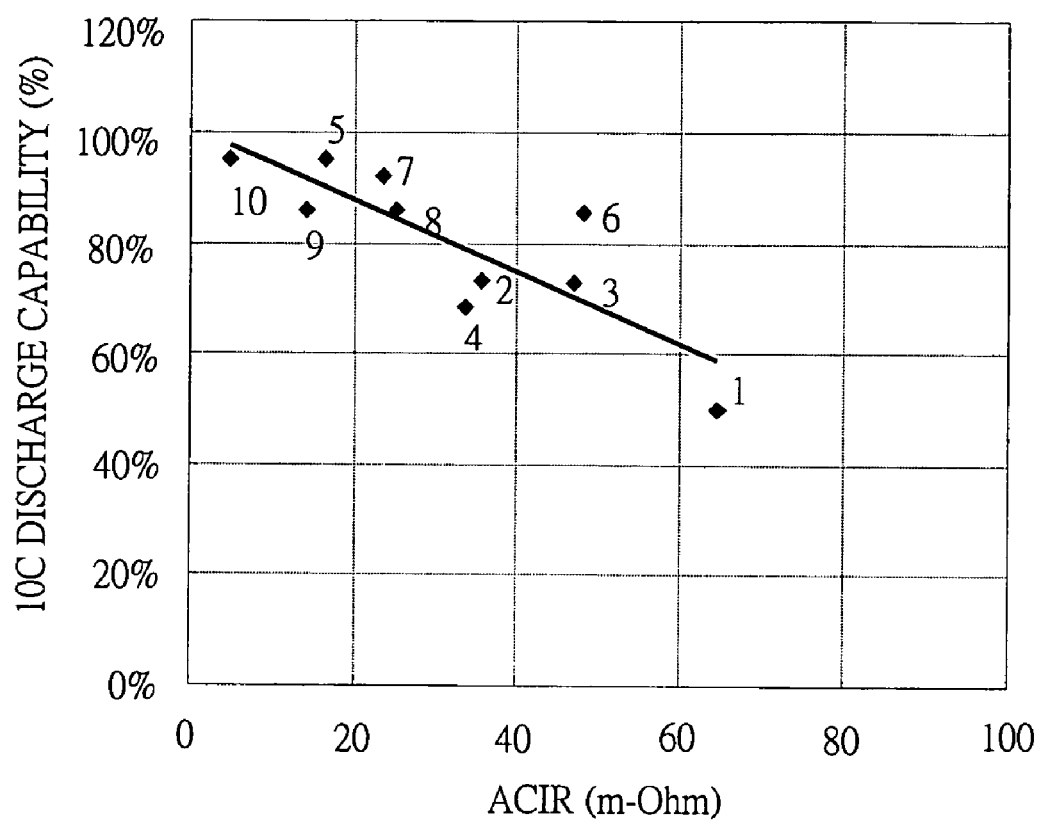
FIG. 4 indicates the relationship between the alternating current impedance (ACIR) at 1 KHz of the whole batteries and the 10C discharge capability of the lithium ion secondary batteries having the 10 different designs shown in FIGS. 1A to 1J.

FIG. 4 shows the relationship between the 10C discharge capability and ACIR of the lithium ion secondary batteries having designs of Group 1 to Group 10 listed in Table 1 and 2. As shown in FIG. 4, it can be seem that there is a correlation between the discharge capability of the battery at 10C rate and ACIR. The 10C discharge capability of the battery will exceed 80%, when ACIR is less than 30 m$\Omega$.

Although the present invention has been described with reference to specific details of certain embodiments thereof, it is not intended that such details should be regarded as limitations upon the scope of the invention except as and to the extent that they are included in the accompanying claims. Many modifications and variations are possible in light of the above disclosure.

What is claimed is:

1. A lithium ion secondary battery comprising a positive electrode; a negative electrode; a separating film that separates the positive electrode and the negative electrode; and an electrolyte forming a lithium ion channel between the positive electrode and the negative electrode, wherein the positive electrode comprises a current collector substrate; one single tab or a plurality of tabs connected to the current collector substrate; and an electrode layer of a positive electrode material on one surface of the current collector, wherein the positive electrode material comprises LiFePO$_4$ as a major component thereof, and the electrode layer of the positive electrode material has a ratio of its area to its thickness greater than 1.2×10$^6$ mm, and wherein the lithium ion secondary battery has a ratio of its capacity at discharge rate of 10C to its capacity at discharge rate of 1C is greater than 80%.

2. The lithium ion secondary battery of claim 1, wherein a farthest distance between the single tab and the edge of the substrate is less than 1200 mm when the positive electrode only has one single tab; and two adjacent tabs has a span less than 2400 mm along a longitudinal direction of the substrate, when the positive electrode includes a plurality of tabs.

3. The lithium ion secondary battery of claim 1, wherein the lithium ion secondary battery has an alternating current impedance at 1 KHz of less than or equal to 30 mΩ.

4. The lithium ion secondary battery of claim 2, wherein the electrode layer of the positive electrode material on the surface of the substrate has a thickness between 30 to 150 μm.

5. The lithium ion secondary battery of claim 2, wherein the positive electrode material further comprises LiMn$_2$O$_4$, LiCoO$_2$, Li[Ni,Co,Mn]O$_2$, or Li[Ni,Co,Al]O$_2$.

6. A lithium ion secondary battery comprising a positive electrode; a negative electrode; a separating film that separates the positive electrode and the negative electrode; and an electrolyte forming a lithium ion channel between the positive electrode and the negative electrode, wherein the positive electrode comprises a current collector substrate; one single tab or a plurality of tabs connected to the current collector substrate; and an electrode layer of a positive electrode material on one surface of the substrate, wherein the positive electrode material comprises a lithium compound as a major component thereof, the lithium compound has a conductivity of a level between 10$^{-5}$ to 10$^{-10}$ S/cm, and the electrode layer of the positive electrode material has a ratio of its area to its thickness greater than 1.2 ×10$^6$ mm, and wherein the lithium ion secondary battery has a ratio of its capacity at discharge rate of 10C to its capacity at discharge rate of 1C greater than 80%.

7. The lithium ion secondary battery of claim 6, wherein the lithium compound is a lithium transition metal phosphate.

8. The lithium ion secondary battery of claim 7, wherein the lithium transition metal phosphate is LiMPO$_4$ with an olivine or modified olivine crystal structure, wherein M is a transition metal.

9. The lithium ion secondary battery of claim 8, wherein LiMPO$_4$ is LiFePO$_4$, metal-doped LiFePO$_4$, or surface-modified or carbon-coated LiFePO$_4$.

10. The lithium ion secondary battery of claim 6, wherein a farthest distance between the single tab and the edge of the substrate is less than 1200 mm when the positive electrode only has one single tab; and two adjacent tabs has a span less than 2400 mm along a longitudinal direction of the substrate, when the positive electrode includes a plurality of tabs.

11. The lithium ion secondary battery of claim 7, wherein the lithium ion secondary battery has an alternating current impedance at 1 KHz of less than or equal to 30 mΩ.

12. The lithium ion secondary battery of claim 10, wherein the electrode layer of the positive electrode material on one surface of the substrate has a thickness between 30 to 150 μm.

13. The lithium ion secondary battery of claim 10, wherein the positive electrode active material further comprises LiMn$_2$O$_4$, LiCoO$_2$, Li[Ni,Co,Mn]O$_2$, or Li[Ni,Co,Al]O$_2$.

14. The lithium ion secondary battery of claim 7, wherein the electrode layer of the positive electrode material on one surface of the substrate has a thickness between 30 to 150 μm.

15. The lithium ion secondary battery of claim 8, wherein the electrode layer of the positive electrode material on one surface of the substrate has a thickness between 30 to 150 μm.

16. The lithium ion secondary battery of claim 10, wherein the electrode layer of the positive electrode material on one surface of the substrate has a thickness between 30 to 150 μm.

17. The lithium ion secondary battery of claim 16, wherein the lithium ion secondary battery has an alternating current impedance at 1 KHz of less than or equal to 30 mΩ.

18. The lithium ion secondary battery of claim 16, wherein the positive electrode material further comprises LiMn$_2$O$_4$, LiCoO$_2$, Li[Ni,Co,Mn]O$_2$, or Li[Ni,Co,Al]O$_2$.

19. The lithium ion secondary battery according to claim 6, wherein the positive electrode material comprises a positive electrode active material, conductive carbon, and a binder that binds the positive electrode active material onto the substrate.

* * * * *